US008239963B2

(12) United States Patent
Jennings et al.

(10) Patent No.: US 8,239,963 B2
(45) Date of Patent: Aug. 7, 2012

(54) METHOD OF PROTECTING A PASSWORD FROM UNAUTHORIZED ACCESS AND DATA PROCESSING UNIT

(75) Inventors: David Jennings, Munich (DE); John Barstow, Swindon (GB); Patrik Eder, Taufkirchen (DE); Michael Goedecke, Starnberg (DE); Richard Knight, Baierbrunn (DE)

(73) Assignee: Intel Mobile Communications GmbH, Neubiberg (DE)

( * ) Notice: Subject to any disclaimer, the term of this patent is extended or adjusted under 35 U.S.C. 154(b) by 807 days.

(21) Appl. No.: 11/861,288

(22) Filed: Sep. 26, 2007

(65) Prior Publication Data

US 2009/0083858 A1    Mar. 26, 2009

(51) Int. Cl.
G06F 7/04 (2006.01)
H04L 29/06 (2006.01)

(52) U.S. Cl. .......................................... 726/27; 713/182
(58) Field of Classification Search .............. 726/27; 713/182
See application file for complete search history.

(56) References Cited

U.S. PATENT DOCUMENTS

| 4,942,606 | A  | * | 7/1990  | Kaiser et al.     | 726/19  |
|-----------|----|---|---------|-------------------|---------|
| 4,959,860 | A  | * | 9/1990  | Watters et al.    | 726/19  |
| 6,543,684 | B1 | * | 4/2003  | White et al.      | 235/379 |
| 6,665,800 | B1 | * | 12/2003 | Jaber             | 726/19  |
| 6,681,304 | B1 | * | 1/2004  | Vogt et al.       | 711/164 |
| 6,959,394 | B1 | * | 10/2005 | Brickell et al.   | 726/5   |
| 7,665,146 | B2 | * | 2/2010  | Munje et al.      | 726/28  |
| 2002/0083327 | A1 | * | 6/2002  | Rajasekaran et al. | 713/182 |
| 2003/0204732 | A1 | * | 10/2003 | Audebert et al.   | 713/182 |
| 2004/0164883 | A1 | * | 8/2004  | Horie             | 341/51  |
| 2005/0015629 | A1 | * | 1/2005  | Wang              | 713/202 |
| 2005/0231369 | A1 | * | 10/2005 | Friedrich et al.  | 340/572.1 |
| 2006/0090077 | A1 | * | 4/2006  | Little et al.     | 713/184 |
| 2006/0107315 | A1 | * | 5/2006  | Fiske             | 726/17  |
| 2006/0200679 | A1 | * | 9/2006  | Hawk et al.       | 713/183 |
| 2007/0294749 | A1 | * | 12/2007 | Nice et al.       | 726/5   |
| 2008/0184036 | A1 | * | 7/2008  | Kavsan            | 713/184 |
| 2008/0263646 | A1 | * | 10/2008 | Jerez             | 726/6   |

OTHER PUBLICATIONS

Emmet Witchel, et. al.:, Mondrian Memory Protection, MIT Computer Architecture Group Home Page, Sep. 14, 2003, pp. 13, Massachusetts Institute of Technology in Cambridge, MA 02139, UK.
Vladimir Kiriansky, et. al.:, Secure Execution Via Program Shepherding, MIT Computer Architecture Group Home Page, Sep. 24, 2004, pp. 16, Massachusetts Institute of Technology in Cambridge, MA 02139, UK.

* cited by examiner

*Primary Examiner* — Techane Gergiso

(57) ABSTRACT

A method of protecting a password from unauthorized access and a data processing unit are provided. An embodiment of the method of protecting a password from unauthorized access comprises storing data representing at least a portion of a password in a memory, assigning the data to at least one of a plurality of instructions, storing the plurality of instructions as processor executable code in the memory, and preventing read-out of the processor executable code as data from the memory.

19 Claims, 4 Drawing Sheets

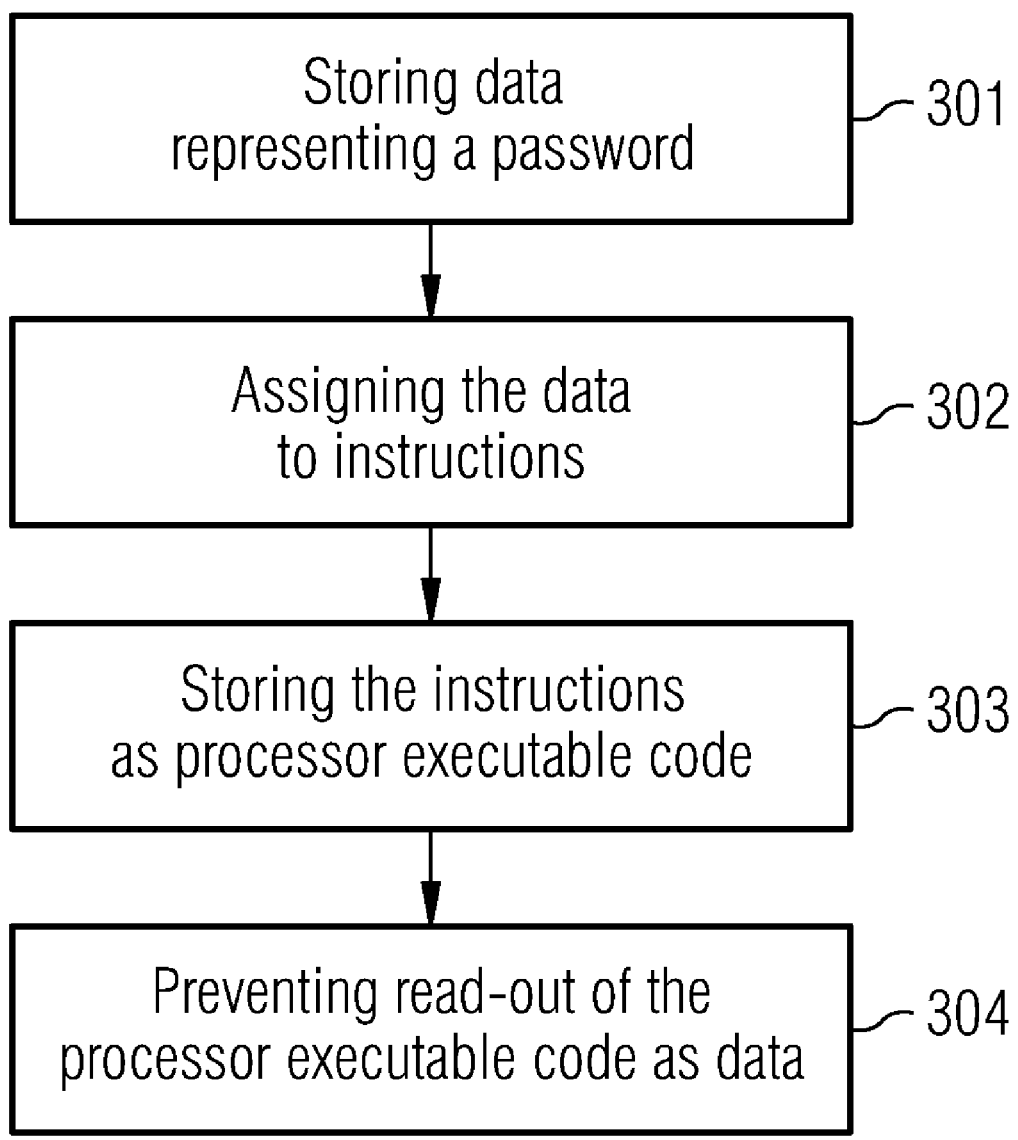

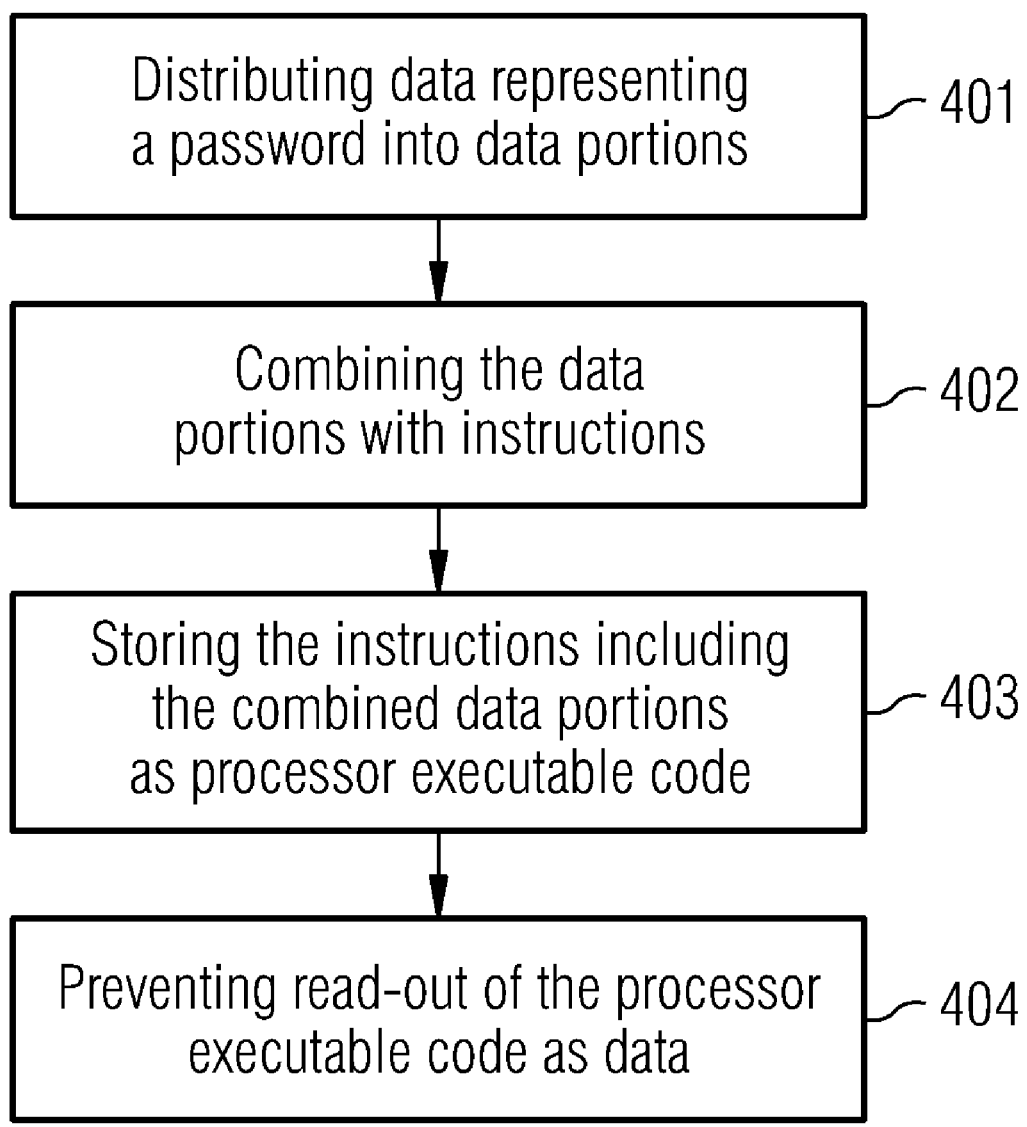

METHOD OF PROTECTING A PASSWORD FROM UNAUTHORIZED ACCESS AND DATA PROCESSING UNIT

TECHNICAL FIELD

The present invention relates generally to a method of protecting a password from unauthorized access and a data processing unit.

BRIEF DESCRIPTION OF THE SEVERAL VIEWS OF THE DRAWINGS

FIG. 3 shows a flow diagram of a method according to an embodiment of the invention;

FIG. 4 shows a flow diagram of a method according to another embodiment of the invention;

DETAILED DESCRIPTION OF THE INVENTION

Figure 1:
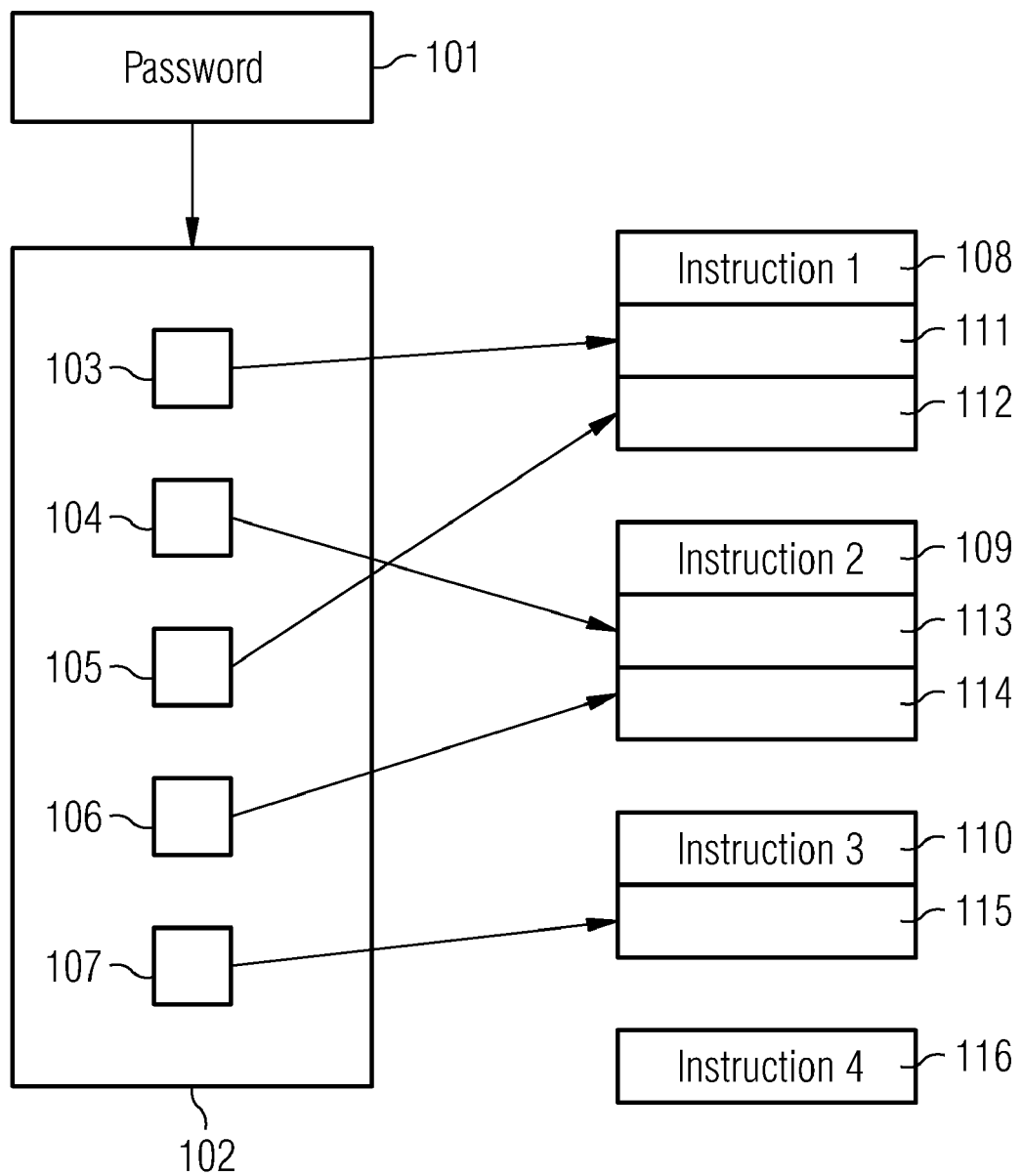
FIG. 1 shows a data flow diagram according to an embodiment of the invention.

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below.

The term "password" usually means some information which is to be kept secret and has to be presented to get access to some other information or a resource. Here the term "password" is also used to denote representations or encodings of the information. For example, a password may be defined by a sequence of letters, numbers and special characters. It may be represented or encoded by another sequence of binary data, which other sequence can be also called a password.

In accordance with an embodiment of the invention, a method of protecting a password from unauthorized access is provided comprising storing data representing at least a portion of a password in a memory, assigning the data to at least one of a plurality of instructions, storing the plurality of instructions as processor executable code in the memory, and preventing read-out of the processor executable code as data from the memory.

In accordance with another embodiment of the invention, a method of protecting a password from unauthorized access is provided comprising distributing data representing at least a portion of a password into a plurality of data portions, combining each of the data portions with at least one of a plurality of instructions, storing the plurality of instructions including the combined data portions as processor executable code in a memory, and preventing read-out of the processor executable code as data from the memory.

In accordance with another embodiment of the invention, a data processing unit is provided comprising a memory to store data representing at least a portion of a password, the memory further to store a plurality of instructions as processor executable code, a control unit to assign the data to at least one of the plurality of instructions, and a circuit arrangement to prevent read-out of the processor executable code as data from the memory.

In accordance with yet another embodiment of the invention, a data processing unit is provided comprising a control unit to distribute data representing at least a portion of a password into a plurality of data portions, the control unit further to combine each of the data portions with one of a plurality of instructions, a memory to store the plurality of instructions including the combined data portions as processor executable code, and a circuit arrangement to prevent read-out of the processor executable code as data from the memory.

Illustratively, the password and/or some information about how to retrieve the password is linked to the plurality of instructions stored as processor executable code in the memory. Since read-out of the processor executable code as data from the memory is prevented the password is protected from unauthorized access.

According to an embodiment of the invention, read-out of the processor executable code as code to be executed by a processor is allowed, and transfer of the allowably read-out processor executable code to a processor is allowed.

According to an embodiment of the invention, the data representing the password are retrieved by executing the processor executable code.

The data representing the password may be stored as part of the processor executable code. They may be built into the instructions of the processor executable code. According to embodiments of the invention at least one of the plurality of instructions is an immediate instruction.

The processor executable code may include additional instructions to carry out security related processes. The plurality of instructions to which the data representing the password are assigned may be distributed throughout the processor executable code. Thus the password has an even stronger protection from unauthorized access.

In a data processing system where secure and non-secure code is executed by a single processor, a secure method is required to control the access to a critical hardware resource. An example of such a critical hardware resource would be a secret hardware based key for use in a cryptographic operation. Access to the hardware resource should only be possible when a certain piece of secure code is executed in the system.

This can be achieved e.g. by using a separate (additional) processor for secure accesses, by using a processor with a hardware secure thread, or by using a state machine controlling access to instruction and data memory. Alternatively a password may be used to control access to the hardware resource.

When using a password for controlling access to a resource, it is generally desirable to keep the password secret such that it is only known to those who are authorized to use the resource and may not be used by others. For instance, in a data processing system where secure and non-secure code are executed by a single processor a form of secure access to a resource may be provided by using a password which is only accessible when secure code is executed. The password has to be available in the system since at some point it needs to be used but access to the password has to be protected from an attacker reading and using it. In other words, the password has to be protected from unauthorized access.

FIG. 1 shows a data flow diagram according to an embodiment of the invention.

A password 101 is represented by data 102 stored in a memory. The data 102 comprise a plurality of data portions 103, 104, 105, 106, and 107. The data portions are assigned individually to one of a plurality of instructions 108, 109 and 110. In the example shown, data portion 103 is assigned to a first instruction 108 ("Instruction 1"), data portion 104 is assigned to a second instruction 109 ("Instruction 2") and so forth. The instructions are stored as processor executable code in the memory. This means that the code can only be executed, and cannot be read out as data. The data portions assigned to the instructions 108, 109 and 110 may be stored as part of the processor executable code.

In order to do this, so called immediate instructions are used in the described embodiment. These are instructions where the data referenced by the instruction is built into the instruction, and no data fetch is required. The instructions 108, 109 and 110 may be assembly instructions which allow the usage of intra instruction constants which can be loaded into a register of a microprocessor without usage of an additional data bus. An example of a processor which can be used in this way is the ARM926. The data which is used in an immediate instruction is often quite short and may only be one byte. In the example shown the first instruction 108 comprises assigned data 111 and 112, the second instruction 109 comprises assigned data 113 and 114, and the third instruction 110 comprises assigned data 115. In this case the assigned data 111 correspond to the data portion 103, the assigned data 112 correspond to the data portion 105 and so forth. Alternatively the immediate instructions may not comprise the data portions 103, 104, 105, 106, and 107 but instead other information useful to retrieve the password, for example links or pointers to other instructions or storage locations where the data 102 are stored.

As the code containing the immediate instructions is executed by a microprocessor, the microprocessor builds up the complete password, i.e. the data representing the password, in an internal register. This is possible by using shift and OR operations when loading the password into the internal register. This can be done until one or more complete 32 bit registers have been loaded with the password.

In one embodiment, the data 102 representing the password 101 are distributed throughout a secure access code in immediate instructions 108, 109 and 110. The secure access code includes one ore more additional instructions 116 to carry out security related processes. Since the password access commands are distributed throughout secure access code the complete password will not be available to the microprocessor if the code is not completely executed. The secure access code can carry out security accesses such as checking that interrupts are disabled, and checking the source of the calling routine.

Figure 2:
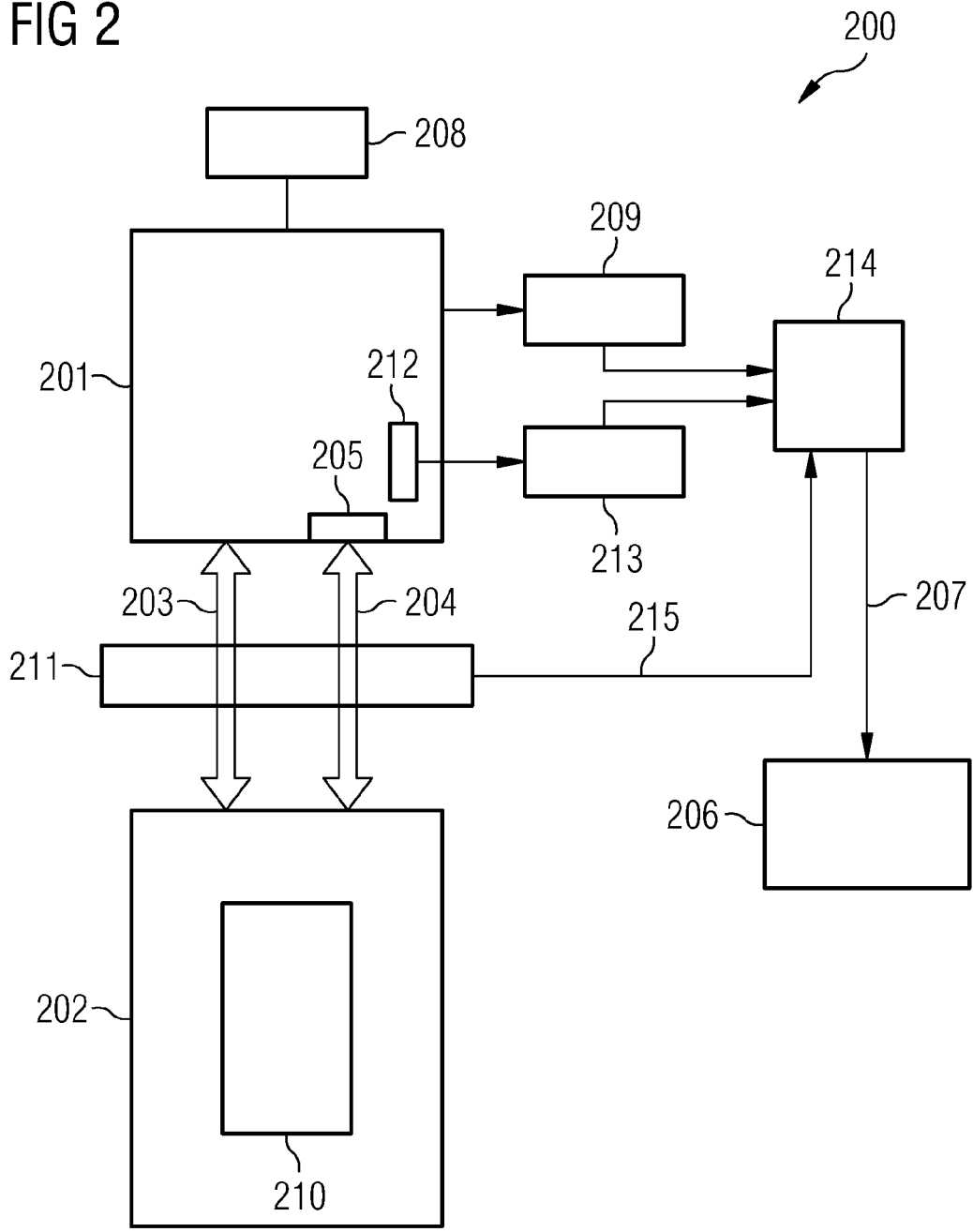
FIG. 2 shows a data processing unit according to an embodiment of the invention.

Referring to FIG. 2 a schematic block diagram showing a data processing unit according to another embodiment of the invention will be discussed in the following.

The data processing unit 200 includes a micro-processor 201 and a memory 202, which are coupled via both a data bus 203 and an instruction bus 204. The instruction bus is connected to an instruction input port 205 of the microprocessor. The data processing unit further includes a security critical hardware resource 206, e.g. a secret hardware based key for use in a cryptographic operation. Access to this hardware resource is protected by a security access signal 207, which in turn is password protected.

The password can be given a new value each time the data processing unit 200 is reset and booted. A good way to do this is to take the value from a random number generator 208. A password delivered by the random number generator 208 while, e.g. immediately after initialization, the data processing unit is in a secure state, is programmed by the microprocessor 201 into a hardware register 209 which cannot be read out. While the system still is in a secure state, the password is also embedded in a piece of secure access code 210 which is stored in the memory 202. In order to do this, immediate instructions are used. The password or key has to be sliced into instruction fitting pieces. The size is determined by the used instruction set, i.e. the size of the constant field in the load mnemonic. The data representing the password are built into a plurality of immediate instructions, which form a part of the secure access code 210. The microprocessor 201 here acts as a control unit to assign the data to at least one of a plurality of instructions. The microprocessor 201 can also be regarded as a control unit to distribute data representing at least a portion of a password into a plurality of data portions, the control unit further to combine each of the data portions with one of a plurality of instructions.

The secure access code 210 is protected by hardware. A bus watcher 211 only allows bus accesses to the memory where the secure access code is secured by the instruction bus 204. This means that the code can only be executed by the microprocessor 201, and cannot be read out as data from the memory. The respective memory region is secured and locked for data accesses from any bus by the bus watcher 211. The hardware of the bus watcher 211 can be regarded as a circuit arrangement to prevent read-out of the processor executable code as data from the memory 202. So the password is secured during execution of non-secure code by the microprocessor. If the secure access code is illegally accessed (over written, or read as data) or this has been tried, the detection circuit of the bus watcher 211 could generate a security alarm, lock off access to the secure hardware resource 206 until next reset, or simply reset the system (i.e. the data processing unit).

It is also possible to make access to the password dependent on a specific security status of the integrated circuit. This could be done using hardware. Access to the password with the incorrect security status will lead to a security alarm.

When the password needs to be used by an application or routine demanding access to the hardware resource 206 the secure access code 210 is loaded into the microprocessor via the instruction bus 204 and the instruction input port 205 and executed immediately. As the secure access code is executed, the microprocessor builds up the complete password, i.e. the data representing the password, in an internal register 212. This is possible by using shift and OR operations when loading the password into the internal register 212. This can be done until one or more complete 32 bit registers have been loaded with the password. Then the microprocessor writes the password into a compare hardware register 213. A security access circuit 214 compares the content of the hardware register 209 and the content of the compare hardware register 213. It activates the security access signal 207 only if the compare hardware register 213 contains the correct value of the password and no security alarm condition of the bus watcher 211 is detected from the alarm signal 215.

The secure access code 210 contains additional instructions 116 to carry out security accesses such as checking that interrupts are disabled, and checking the source of the calling routine. An authorization frame may be executed, where the calling module is determined by reading out the link register (e.g. R14 on ARM systems) and comparing it with a list of allowed addresses. Additionally the local stack frame may be checked on unauthorized return addresses. This ensures that the functionality of retrieving the password can only be used by authorized software parts. The routine which calls the secure access code may be integrity protected by hardware. The data representing the password may be returned to the calling routine in a plurality of portions scrambled in a predetermined manner, requiring that the calling routine has to descramble the data in a defined way before being able to use it.

Since the password access commands (instructions 108, 109, 110) are distributed throughout the secure access code the complete password will not be available to the microprocessor if the code is not completely executed. Upon execution of the secure access code 210 the data processing unit 200 can be forced into a secure state. Thus it is achieved, that only when secure code is executed by the microprocessor 201, access to the hardware resource 206 will be granted.

The security access signal 207 can only be activated by writing the correct value into the hardware compare register 213. Writing the wrong value into the register will cause the security access signal to be locked off until the next reset of the data processing unit 200. An attacker who tries to randomly guess the password will with a high probability fail, as long as the password has a reasonable length. This is because the attacker only has one guess, and then the data processing unit 200 must be reset in order to have another attempt. At this point a new password is generated using the random number generator 208. This means that brute force attacks take much longer than the password length implies, and a systematic attack will not function.

Use of the password could also be protected with additional hardware. In this case, hardware checks if the password has been read in its entirety. If this is not the case, then the password cannot be used, and will be rejected.

Thus the hardware resource 206 is protected by a combination of hardware and software, with the advantage that the software can be enhanced depending on the level of protection required. The data processing unit 200 can be a unit or system integrated into a single integrated circuit. It may also be a system consisting of several integrated circuits and/or other pieces of equipment.

FIG. 3 shows a flow diagram of a method according to an embodiment of the invention.

In 301, data representing at least a portion of a password are stored in a memory. For example, this can be performed by the microprocessor 201, which is coupled to the data memory 202. The coupling may be provided by the data bus 203.

In 302, the data are assigned to at least one of a plurality of instructions. This may also be performed by the microprocessor 201. The instructions may be immediate instructions, which allow to use intra instruction constants. With these it is possible, to execute assembly instructions to load data into a register of a microprocessor without having to use an additional data bus.

In 303, the plurality of instructions is stored as processor executable code in the memory. As shown in FIG. 1, the assigned data 111, 112, 113,114 and 115 may be stored together with the instructions 108, 109 and 110. In this case they form part of the processor executable code 210 in the memory 202. Alternatively, the assigned data may remain or can be stored at another memory location. Some information providing a link between the respective data and the instructions they are assigned to may be included in the instructions.

In 304, read-out of the processor executable code as data from the memory is prevented. For example, the bus watcher 211 controls bus accesses to the region of the memory 202 where the processor executable code 210 is stored. Any data read or write accesses are blocked by the bus watcher hardware. The bus watcher prevents any attempts to access the processor executable code 210 via the data bus 203. Thus the password 101, more precisely the data 102 representing the password, is protected from unauthorized access.

FIG. 4 shows a flow diagram of a method according to another embodiment of the invention.

In 401, data representing at least a portion of a password are distributed into a plurality of data portions. For example, this can be performed by the microprocessor 201. The data 102 representing the password 101 are sliced into pieces 103, 104, 105, 106 and 107.

In 402, each of the data portions is combined with at least one of a plurality of instructions. This may also be performed by the microprocessor 201. The data portions may be arranged with or linked to the instructions. If the instructions are immediate instructions the data portions can be built into the immediate instructions.

In 403, the plurality of instructions including the combined data portions is stored as processor executable code in a memory. The data 111, 112, 113, 114 and 115 in FIG. 1 may be regarded as data portions combined with instructions 108, 109 and 110. The instructions and combined data portions can be stored together in the memory 202 and then form part of the processor executable code 210.

In 404, read-out of the processor executable code as data from the memory is prevented. For example, the bus watcher 211 controls bus accesses to the region of the memory 202 where the processor executable code 210 is stored. Any data read or write accesses are blocked by the bus watcher hardware. The bus watcher prevents any attempts to access the processor executable code 210 via the data bus 203. Thus the password 101, more precisely the data 102 representing the password, is protected from unauthorized access.

While in the foregoing some embodiments have been described with particular reference to the figures, various embodiments are contemplated by the inventors.

In an embodiment of the invention, the controlling accesses to the memory or to a memory address range where the processor executable code is stored includes using a hardware unit.

An embodiment of the invention includes generating a security alarm when the processor executable code is read out as data or is changed.

In an embodiment of the invention, the processor executable code includes additional instructions to carry out security related processes.

In an embodiment of the invention, the at least one of a plurality of instructions is distributed throughout the processor executable code.

In an embodiment of the invention, executing substantially all of the processor executable code is needed for retrieving completely the data representing at least a portion of a password.

An embodiment of the invention includes assigning a new value to the data representing at least a portion of a password each time an integrated circuit is reset and booted.

In an embodiment of the invention, the assigning the new value to the data representing at least a portion of a password includes using a random number generator.

An embodiment of the invention includes:
programming the data representing at least a portion of a password into a hardware register that cannot be read out;
writing the retrieved data into a hardware compare register; and
activating a security access signal if the hardware compare register contains a correct representation of the data representing at least a portion of a password.

An embodiment of the invention includes enabling access to a secure hardware resource upon activating the security access signal.

An embodiment of the invention includes locking off the security access signal if the hardware compare register contains an incorrect representation of the data representing at least a portion of a password.

An embodiment of the invention includes keeping the locked off security access signal locked off until an integrated circuit is reset and booted.

An embodiment of the invention includes:
executing a software routine, the software routine calling for a secure access needing the data representing at least a portion of a password; and
checking authorization and/or integrity of the software routine using a hardware unit.

An embodiment of the invention includes returning the data representing at least a portion of a password in a plurality of portions scrambled in a predetermined manner.

In an embodiment of the invention, the bus watching circuit is configured to limit data read accesses accessing the memory or a memory address range where the processor executable code is stored.

In an embodiment of the invention, the bus watching circuit is configured to allow instruction read accesses accessing the memory or a memory address range where the processor executable code is stored.

In an embodiment of the invention, the circuit arrangement includes a detection circuit to generate a security alarm when the processor executable code is read out as data or is changed.

In an embodiment of the invention, the processor executable code includes additional instructions to carry out security related processes.

In an embodiment of the invention, the at least one of the plurality of instructions is distributed throughout the processor executable code.

An embodiment of the invention includes an integrated circuit having a boot circuit to assign a new value to the data representing at least a portion of a password each time the integrated circuit is reset and booted.

An embodiment of the invention includes a random number generator to generate the new value.

An embodiment of the invention includes:
a hardware register to reveive the data representing at least a portion of a password, the hardware register configured such that it cannot be read out;
a hardware compare register to have the retrieved data written into it; and
a security access circuit to activate a security access signal, if the hardware compare register contains a correct representation of the data representing at least a portion of a password.

An embodiment of the invention includes a secure hardware resource and is configured to enable access to the secure hardware resource upon activation of the security access signal.

An embodiment of the invention is configured to lock off the security access signal if the hardware compare register contains an incorrect representation of the data representing at least a portion of a password.

An embodiment of the invention includes an integrated circuit having a boot circuit and is configured to keep the locked off security access signal locked off until the integrated circuit is reset and booted.

An embodiment of the invention includes an integrity checking circuit to check the integrity of a software routine if the software routine, when executed by the processor, calls for a secure access needing the data representing at least a portion of a password.

The invention claimed is:

1. Method of protecting a password from unauthorized access, comprising:
providing data representing at least a portion of a password;
embedding the data into at least one of a plurality of instructions wherein the data is embedded into the plurality of instructions such that no data fetch operation is required;
storing the plurality of instructions as processor executable code in the memory; and
preventing read-out of the processor executable code as data from the memory;
wherein the processor executable code includes additional instructions to carry out security related processes.

2. The method as recited in claim 1, further comprising:
allowing read-out of the processor executable code as code to be executed by a processor; and
allowing transfer of the allowably read-out processor executable code to a processor.

3. The method as recited in claim 2, wherein allowing read-out of the processor executable code as code to be executed by a processor includes allowing instruction read accesses accessing the memory or a memory address range where the processor executable code is stored.

4. The method as recited in claim 1, wherein the at least one of a plurality of instructions is an immediate instruction.

5. The method as recited in claim 1, further comprising executing the processor executable code to retrieve the data representing at least a portion of a password.

6. The method as recited in claim 1, wherein preventing read-out of the processor executable code as data from the memory includes controlling accesses to the memory or to a memory address range where the processor executable code is stored.

7. The method as recited in claim 1, wherein preventing read-out of the processor executable code as data from the memory includes limiting data read accesses accessing the memory or a memory address range where the processor executable code is stored.

8. Method of protecting a password from unauthorized access, comprising:
distributing data representing at least a portion of a password into a plurality of data portions;
embedding each of the data portions with at least one of a plurality of instructions, thereby providing a plurality of instructions with embedded data portions, wherein the data portions are embedded into the plurality of instructions such that no data fetch operation is required;
storing the plurality of instructions with embedded data portions as processor executable code in a memory; and
preventing read-out of the processor executable code as data from the memory;
wherein the processor executable code includes additional instructions to carry out security related processes.

9. The method as recited in claim 8, further comprising:
allowing read-out of the processor executable code as code to be executed by a processor; and
allowing transfer of the allowably read-out processor executable code to a processor.

10. The method as recited in claim 8, further comprising executing the processor executable code to retrieve the data representing at least a portion of a password.

11. The method as recited in claim 8, further comprising distributing the plurality of instructions with embedded data portions throughout the processor executable code.

12. Data processing unit comprising:
a memory to store data representing at least a portion of a password, the memory further to store a plurality of instructions as processor executable code;
a control unit to embed the data into at least one of the plurality of instructions, wherein the data is embedded into the at least one of the plurality of instructions such that no data fetch operation is required; and a circuit arrangement to prevent read-out of the processor executable code as data from the memory;

wherein the processor executable code includes additional instructions to carry out security related processes.

13. The data processing unit as recited in claim 12, the circuit arrangement further to allow read-out of the processor executable code as code to be executed by a processor; and the circuit arrangement further to allow transfer of the allowably read-out processor executable code to a processor.

14. The data processing unit as recited in claim 12, wherein the at least one of a plurality of instructions is an immediate instruction.

15. The data processing unit as recited in claim 12, further comprising:

a processor to process instructions and having an instruction input port, the processor further to execute the processor executable code to retrieve the data representing at least a portion of a password when receiving the processor executable code via the instruction input port;

the circuit arrangement further to transfer the allowably read-out processor executable code to the instruction input port of the processor.

16. The data processing unit as recited in claim 12, the circuit arrangement further comprising a bus arrangement to couple the memory to a processor, the bus arrangement having a bus watching circuit to control accesses to the memory or to a memory address range where the processor executable code is stored.

17. Data processing unit comprising:

a control unit to distribute data representing at least a portion of a password into a plurality of data portions, the control unit further to embed each of the data portions into one of a plurality of instructions thereby providing a plurality of instructions with embedded data portions, wherein the data is embedded into one of the plurality of instructions such that no data fetch operation is required;

a memory to store the plurality of instructions with embedded data portions as processor executable code; and a circuit arrangement to prevent read-out of the processor executable code as data from the memory;

wherein the processor executable code includes additional instructions to carry out security related processes.

18. The data processing unit as recited in claim 17, the circuit arrangement further to allow read-out of the processor executable code as code to be executed by a processor; and the circuit arrangement further to allow transfer of the allowably read-out processor executable code to a processor.

19. The data processing unit as recited in claim 17, further comprising:

a processor to process instructions, and having an instruction input port, and further to execute the processor executable code to retrieve the data representing at least a portion of a password when receiving the processor executable code via the instruction input port;

the circuit arrangement further to transfer the allowably read-out processor executable code to the instruction input port of the processor.

* * * * *